March 26, 1968   H. L. BAUMBACH   3,374,723
AUTOMATIC ELECTRICAL CONTROL APPARATUS AND FILM
PRINTER CUING SYSTEM EMBODYING SAME
Filed March 16, 1965   5 Sheets-Sheet 1

INVENTOR.
HARLAN L. BAUMBACH
BY Forrest J. Lilly
ATTORNEY

United States Patent Office 3,374,723
Patented Mar. 26, 1968

3,374,723
AUTOMATIC ELECTRICAL CONTROL APPARATUS AND FILM PRINTER CUING SYSTEM EMBODYING SAME
Harlan L. Baumbach, 14332 Mulholland Drive, Los Angeles, Calif. 90024
Filed Mar. 16, 1965, Ser. No. 440,131
30 Claims. (Cl. 95—75)

ABSTRACT OF THE DISCLOSURE

An automatic electrical control system for film printers and other devices which require initial recording and subsequent retrieval of control information in aggregately synchronized relation to the movement of a member external to the control system, the control system having an information storage member, a transcribing head for recording control information on and retrieving the control information from the storage member, and a transport mechanism powered by a synchro motor electrically linked to a synchro transmitter driven by the external member for driving the storage member and transcribing head in relative movement in unison with the movement of the external member.

---

This invention relates generally to electrical control systems and has more particular reference to an automatic electrical control system and an automatic film printer cuing system embodying the control system.

In its broader aspects, the invention is concerned with the automatic control of a slave unit having an operating cycle which is required to be synchronized with the movement of a driven member external to the control system in such manner that each successive portion of the cycle occurs in response to movement of the driven member through a preselected position. To this end, the invention provides an automatic electrical control system including an information storage member to contain the automatic control information for the slave unit, and wherein initial recording of the control information on and subsequent retrieval of the information from the storage member is accurately synchronized with the movement of the driven member in a new and unique way, whereby the operating cycle of the slave unit is caused to occur in precise synchronism with the movement of the driven member. It will become readily apparent to those skilled in the art, as the description proceeds, that the synchronized control concept of the invention may be employed to advantage in various control applications. The invention will be disclosed herein, however, in connection with one presently useful application thereof, to wit, automatic control of motion picture film printers. For this reason, a brief discussion of the existing techniques of printing motion picture film is deemed to be advisable. As will appear from the following discussion, the invention may be employed to control both so-called continuous film printers, in which the film movement past the printing aperture is uninterrupted and occurs at a constant speed in such manner that the exposure of each frame takes place as the frame undergoes motion past the aperture, and so-called step printers, in which the film movement past the printing aperture is intermittent, whereby each frame is exposed while its motion is momentarily arrested at the aperture.

The production of a motion picture involves the filming of a great number of different scenes with different cameras and crews and under various conditions of light, background scenery, and other factors which affect the exposure of the film. The resulting exposed negative film is then edited and spliced to form what is commonly referred to in the trade as a production negative. From this production negative are made the positive prints, commonly referred to as final prints, which are commercially distributed. In most cases, each final print is made directly from the production negative. Occasionally, however, the final prints are made through the intermediate steps of making a master positive print from the production negative, a duplicate negative from the master positive, and the final prints from the duplicate negative. Also, many 16 mm. motion pictures are shot on reversal positive film and the prints are made on reversal print material, whereby the printing sequence is positive to positive.

Regardless of the production method which is followed to arrive at the final prints, however, printing light corrections are required at some stage in the photographic printing operation to compensate for the varying conditions under which the different scenes of the production negative are originally filmed. In the first production method discussed above, for example, the required printing light corrections are made during the printing of each final print from the production negative. In the second production method, the required light corrections are made either during the printing of the master positive from the production negative, in which case the master positive is referred to as a one light master positive, or during the printing of the final prints from the duplicate negative. If the production negative is a black and white film, the printing light corrections involve only printing light intensity changes. If the production negative is a color film, the printing light corrections involve correction of both the color composition and intensity of the printing light.

As is well known to those skilled in the art, film other than motion picture film, such as film which is exposed in 35 mm. still cameras and other still cameras, for example, is commonly printed in continuous strip form, using the same basic printing techniques, including printing light correction, as those involved in the printing of motion picture film. It will become readily apparent as the description proceeds that the present invention may be employed in the printing of all of these different types of film.

For convenience, however, in the ensuing description, the film which is to be printed will be referred to as the negative film, or simply the negative. The film on which the scenes of the negative are printed will be referred to as the positive film, or simply the positive. The required printing light corrections, therefore, are made as the negative and positive travel in unison through the printing light beam.

Modern photographic printers for continuous film of the type discussed above are commonly equipped with a light change mechanism which makes the required printing light corrections automatically during the operation of the printers. Briefly, this light change mechanism comprises an information storage unit into which the several desired printing light corrections are initially preset. During operation of the printer, this light change mechanism is periodically actuated, to effect the desired printing light corrections, by cutting means which are provided on the negative at the different positions where such light corrections are required. In some cases, vaious special photographic effects, such as fades and dissolves, are also initiated in response to cuing means on the negative.

At the present time, two different cuing techniques are employed in photographic printers of the kind under discussion. One of these existing cuing techniques, for example, involves the formation of cuing notches in one side edge of the negative. Those photographic printers which utilize this cuing technique are equipped with a cuing switch that is momentarily actuated by each cuing notch and, in turn, actuates the light change mechanism. The other existing cuing technique involves the placement of small metallic cuing foils on the negative adjacent one edge thereof. These cuing foils are commonly provided with a pressure-sensitive adhesive backing, such that they may be simply pressed onto the negative. Those photographic printers which utilize this latter cuing technique are equipped with electrical contacts or other means for sensing each cuing foil and actuating the light change mechanism in response to the passage of each cuing foil past the sensing means.

These existing cuing techniques possess several inherent disadvantages which this invention seeks to overcome. Cuing notches, for example, tend to weaken the negative to such an extent that the effective life of the negative, measured in terms of the number of prints that may be made from the negative, is materially reduced. This is particularly true in the case of 16 mm. film. Another disadvantage of such cuing notches resides in the fact that once a cuing notch is cut into the negative, it is impractical or impossible to thereafter change the position of the notch. This, of course, constitutes a serious disadvantage since cuing notches are frequently improperly placed on the negative, which fact is not revealed until subsequent initial screening of the resulting positive. In addition, notching of the negative requires handling of the latter and, as a consequence of such handling, the negative is frequently scratched, marred by fingerprints, or otherwise damaged. The application of metallic cuing foils to a negative also requires handling of the negative, with the result that the latter is frequently marred for the reasons just stated. Moreover, while the pressure-sensitive adhesive bond between these cuing foils and the negative permits the positions of the foils to be changed, the foils frequently shift in position or separate entirely from the negative. This results either in an improper light correction or in the omission of a light correction. The omission of a light correction is particularly serious since it results in improper occurrence of all the subsequent light corrections. Another disadvantage of cuing foils resides in the fact that they render it difficult, if not impossible, to clean a negative periodically with cleaning solvent, as is necessary to maintain the negative in the proper condition for printing, since the pressure-sensitive adhesive backing of the foils is soluble in the solvent.

It is apparent at this point, therefore, that there is a definite need for an improved means for periodically actuating or cuing the light change mechanism of film printers. One aspect of the present invention is concerned with providing an automatic cuing system for this purpose. According to this aspect of the invention, the latter provides an electrical cuing system for periodically cuing the light change mechanism of a continuous film printer in synchronism with the movement of the negative and positive films through the printing light beam of the printer in such manner that the desired printing light corrections and/or other photographic effects, such as fades and dissolves, occur at the proper scenes of the negatives. As noted earlier, however, the invention is not limited in usefulness to the automatic control of photographic printers and may be used to advantage in many other control applications requiring automatic control of a slave unit in precise synchronism with the movement of an external driven member.

It is, accordingly, a general object of the invention to provide a new and improved automatic electrical control system for automatically controlling a slave unit having an operating cycle which is required to be precisely synchronized with the movement of a driven member external to the control system, such that each successive portion of the operating cycle occurs in response to movement of the driven member through a preselected position.

Another object of the invention is to provide an automatic electrical control system of the character described wherein the slave unit is automatically controlled in response to control information contained on an information storage member, and wherein further initial recording of the control information on and subsequent retrieval of the control information from the storage member is accurately synchronized, in a new and unique way, with the movement of the external driven member, whereby the operating cycle of the slave unit is caused to occur in precise synchronism with the movement of the driven member.

Yet another object of the invention is to provide an automatic electrical control system of the character described which is uniquely adapted for cuing the light change mechanism of a continuous film printer in precise synchronism with the movement of the negative and positive films through the printer.

A further object of the invention is to provide an automatic electrical cuing system for continuous film printers which eliminates the necessity of providing cuing notches, cuing foils, or other cuing means on the negative and, as a consequence, prolongs the effective life of the negative, minimizes or eliminates handling of the negative and thereby the possibility of damage to the negative as a result of such handling, permits the negative to be periodically cleaned with solvent, and eliminates the possibility of improper cuing of the printer light change mechanism.

Yet a further object of the invention is to provide an automatic electrical control system of the character described which is relatively simple in construction, economical to fabricate, reliable in operation, simple to use, and otherwise ideally suited to its intended purposes.

Other objects, advantages, and features of the invention will become readily apparent as the description proceeds.

Briefly, the objects of the invention are accomplished by providing an electrical control system equipped with a recording apparatus for initially recording control information on an information storage member and an electrical control apparatus for subsequently retrieving this control information from the storage member and operating a slave unit in response to such control information. The recording apparatus comprises a transcribing unit including an electrically actuated transcribing head for transferring the control information to the information storage member in response to electrical actuation of the head and a transport mechanism for driving this head and the storage member in relative recording movement. The electrical control apparatus comprises a transcribing unit including a transcribing head for sensing the control information on the information storage member and converting this control information to an electrical control signal, and a transport mechanism for driving the latter head and the storage member in relative read-out movement. One highly unique and important feature of the invention resides in the fact that the transcribing unit of the recording apparatus and the transcribing unit of the control apparatus are substantially identical, whereby the cost of the present electrical control system is minimized. Another important feature of the invention resides in the fact that during recording, the transcribing unit is interlocked with the film, thereby permitting unified forward and reverse movement, as well as stationary positioning of the film and transcribing units, as is desirable in searching for the exact location of a scene change. During printing, the control unit may go forward for one print, then in the reverse direction for the next print, and so on for additional prints, always remaining interlocked with the film. In the ensuing description, the transcribing unit of the recording apparatus is referred to as a recording unit and the transcribing head of this unit is referred to as a recording head. The transcribing unit of the control apparatus is referred to as a master control unit or reader unit and the transcribing head of this latter unit is referred to as a read-out head.

It will become readily apparent as the description proceeds that the present control system may utilize various types of information storage members as well as various information storage and retrieval techniques. For example, the illustrative embodiment of the invention employs a punched tape as the information storage member. The information recording head of this embodiment comprises a perforating head for punching perforations in the information storage tape, and the read-out head comprises a photosensitive detector for sensing the tape perforations.

As noted earlier, the invention, in its broader aspects, is concerned with the automatic control of a slave unit having an operating cycle which is required to be synchronized with the movement of a driven member external to the control system, such that each successive portion of the cycle occurs in response to movement of the driven member through a preselected position. To this end, both the recording unit and the reader unit of the present control system embody a unique synchronous drive coupling between the transport mechanism of the respective unit and the external driven member relative to which the operation of the slave unit is to be synchronized, whereby the transport mechanism of each unit is driven, in effect, directly from, and thereby in precise synchronism with, the external driven member. In this way, during automatic control of the slave unit by the control apparatus, retrieval of the pre-recorded control information on the information storage member, and hence the operation of the slave unit, is precisely synchronized with the movement of the external driven member. In the illustrative embodiment of the invention, for example, the synchronous drive coupling of the recording unit and the reader unit comprises a synchro transmitter having a shaft which is adapted for connection to the external driven member and a synchro motor having a shaft which rotates in unison with the transmitter shaft and is drivably coupled to the transport mechanism of the respective unit.

The invention will now be described in greater detail by reference to the attached drawings, wherein:

FIG. 10 is a section similar to FIG. 6 through the recording head of the recording apparatus in FIG. 1a;

FIG. 11 is an enlarged section taken on line 11—11 in FIG. 10;

In these drawings, the electrical control apparatus of the invention is designated, generally, by the reference numeral 10, and the slave unit to be controlled is designated by the reference numeral 12. In line with the earlier discussion, the slave unit is shown to be a continuous film printer, such as a motion picture film printer. Film printer 12 is conventional and, therefore, has been illustrated in semidiagrammatic fashion and will be described only in such detail as is necessary to a full and complete understanding of the invention. With this in mind, the printer comprises supply and take-up reels 14 and 16, respectively, for the film 18 to be printed, and supply and take-up reels 20 and 22, respectively, for the film 24 to be exposed in the printer. As noted earlier, the film 18 is referred to herein as the negative film, or simply the negative, and the film 24 is referred to as the positive film, or simply the positive. The negative and positive are trained about sprockets 26 and 28 in such manner that the films are disposed in face-to-face contact in the region between the sprockets. This region forms the printing zone Z of the printer. The take-up reels 16 and 22 and the sprocket 26 are driven by a motor 30. This motor, therefore, is effective to feed the negative and positive in unison through the printing zone. As these films travel through the printing zone, they are exposed to a printing light beam from a light source 32. Images of the several scenes on the negative are thereby reproduced as latent images on the positive.

As noted earlier, correct exposure of the positive 24 in the printer 12 requires periodic correction of the printing light in order to compensate for the differing conditions under which the several scenes of the negative were initially photographed. To this end, the printer embodies a light change or light correction mechanism 34 into which the required printing light corrections may be preset. Subsequent periodic actuation of this mechanism in the proper timed relation to the movement of the negative and positive through the printing zone Z is effective to produce the desired printing light corrections at the proper scenes of the negative and thereby achieve proper exposure of the positive. According to the present invention, periodic actuation of the light change mechanism 34 in precise synchronism with the movement of the negative 18 and the positive 24 through the printing zone Z of the printer is achieved by operation of the control apparatus 10.

Control apparatus 10 comprises a transcribing unit 36, referred to herein as a master control unit or reader, including an information storage member 38 for containing pre-recorded control information. This control information is sensed or retrieved by a transcribing head 40, which is referred to herein as a read-out head. Storage member 38 and read-out head 40 are driven in their relative read-out movement by means 42. In the particular photographic application illustrated in the drawings, the control information contained on the information storage member consists of discrete information bits which undergo successive relative movement past the read-out head 40 during relative read-out movement of the head and information storage member. The control apparatus 10 is electrically coupled, through a cable 44, to the light change mechanism 34 in such manner that the latter mechanism is actuated, to effect a printing light correction, in response to the relative movement of each information bit on the storage member 38 past the read-out head 40.

Proper occurrence of the printing light corrections in the film printer 12, therefore, requires that the relative read-out movement of the information storage member 38 and the read-out head 40 be accurately synchronized with the movement of the negative 18 and positive 24 through the printing zone Z. To this end, the means 42 for driving the storage member and read-out head in their relative read-out movements comprises a synchronous drive coupling 46 which is drivably connected at one end to the film driving sprocket 26 of the printer 12 and at the other end to the information storage member 38 and read-out head 40 of the reader 36, whereby the storage member and head are driven, in effect, in their relative read-out movement by the sprocket and, thereby, in exact synchronism with the movement of the negative and positive through the printing zone Z of the printer.

It is evident at this point, therefore, that during operation of the film printer 12, the information storage member 38 and read-out head 40 in the reader 36 undergo relative read-out movement past one another in precise synchronism with the movement of the negative 18 and positive 24 through the printing zone Z of the printer. The read-out head generates an electrical impulse in response to the relative movement therepast of each bit of control information on the information storage member. Each such impulse from the read-out head actuates the light change mechanism 34 of the printer to effect a printing light correction. As will be explained later, the control information bits are placed on the information storage member in such manner that the printing light corrections occur at the proper scenes of the negative.

Figure 7:
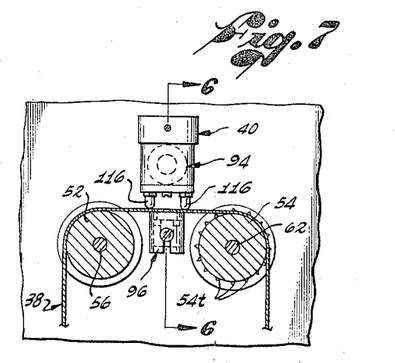
FIG. 7 is an enlarged section taken on line 7—7 in FIG. 2.
Figures 8, 9:
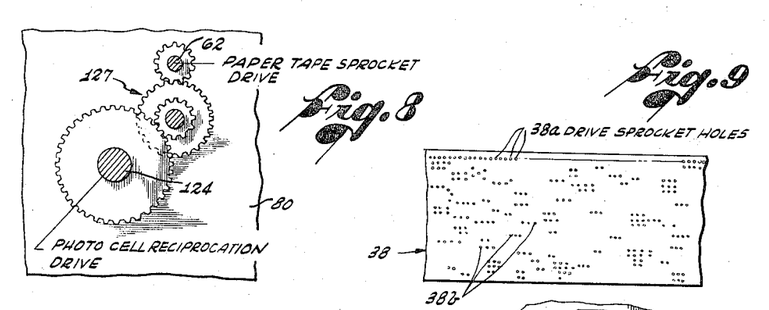
FIG. 8 is an enlarged section taken on line 8—8 in FIG. 2.
FIG. 9 is an enlarged fragmentary detail of the information storage member embodied in the control apparatus of FIG. 1.

Referring now in more detail to the control apparatus 10, the reader 36 comprises a frame 48 including a lower base 49 and an upright support plate 50 rising above the base. Adjacent the upper end of this plate are a roller 52 and a roller sprocket 54 which have approximately the same diameter and are located approximately equal distances from the base. Roller 52 has a central shaft 56, the inboard end of which is rotatably supported in the frame plate 50. The outboard end of the roller shaft is rotatably supported in an outboard support plate 58. Extending between and secured to the lower edge of this outboard plate and the frame plate are posts 60 (FIG. 2) which mount the outboard plate on and in spaced relation to the frame plate. Sprocket 54 has a long central shaft 62, the inboard end of which extends through the frame plate 50. The outboard end of the sprocket shaft is rotatably supported in the outboard support plate 58 and mounts a knurled knob 64 to permit the sprocket shaft to be rotated by hand, for reasons to be explained presently. Roller 52 and sprocket 54 are spaced, as shown best in FIG. 7, and have parallel rotation axes normal to the frame plate 50. Adjacent the lower end of the frame plate is a roller 66 of substantially larger diameter than the roller 52 and the sprocket 54. This lower roller is rotatably supported on a central shaft 68, the inboard end of which extends rearwardly through a vertical slot 70 in the frame plate 50 and is secured to one end of a transverse arm 72. The other end of arm 72 is pivoted at 74 on the rear side of the frame plate for swinging about an axis normal to the plate. Roller 66 is thereby supported on the frame plate for rotation on an axis parallel to the rotation axes of the upper roller 52 and sprocket 54 and for vertical movement toward and away from the latter roller and sprocket. When the frame 48 occupies its normal position shown in the drawings, gravity urges the lower roller downwardly, away from the upper roller and sprocket. Engagement of the lower roller shaft 68 with the lower end of the frame slot 70 limits this downward movement of the lower roller. The lower roller is centered relative to the upper roller and sprocket, as shown.

The illustrated information storage member 38 comprises a punched tape which is required to be opaque for reasons to be explained presently. To this end, the tape may be constructed of any one of the opaque tape materials currently available on the market for this purpose. The ends of the tape 38 are joined to form a loop for encircling the rollers 52, 66 and the sprocket 54 in the manner best illustrated in FIG. 1. This loop is so circumferentially dimensioned that the lower roller 66 is vertically supported by the lower end of the loop with its shaft 68 elevated out of contact with the lower end of the frame slot 70. The weight of the lower roller, therefore, is carried by the loop and thus acts to maintain the tape 38 under tension. It is apparent that the information storage tape 38 may be easily removed from and replaced on the reader 36 by elevating the lower roller 66 out of vertical supporting contact with the tape. The tape rollers 52, 66 and the tape sprocket 54 will be observed to have radial end flanges which are axially spaced to laterally confine the tape 38 therebetween and thereby restrain the tape against lateral movement along the rollers and sprocket. Sprocket 54 is also provided with sprocket teeth 54t adjacent its inboard radial flange for engagement in sprocket holes 38a along the adjacent edge of the tape. Rotation of the sprocket is thus effective to drive the tape in its endwise direction.

Secured to the rear side of and extending rearwardly from the frame plate 50, a distance below the supporting posts 60 for the outboard support plate 58 and parallel to the base 49, is a supporting platform 76. Rigid on the rear end of this platform is an upstanding bracket 78. Platform 76 carries a rigid upstanding plate 80 located behind and in spaced parallel relation to the frame plate 50. Sprocket shaft 62, which extends through the frame plate 50, as noted earlier, also extends through the rear plate 80 and is rotatably supported by bearings, not shown.

Two motors 82 and 84 are mounted side by side on the platform 76, between the platform bracket 78 and the rear support plate 80. The shafts of these motors extend rearwardly, as shown, and mount pulleys 86 and 88, respectively. A third sprocket pulley 90 is fixed to the rear end of the sprocket shaft 62. Trained about the three pulleys 86, 88 and 90, which are located in a common plane, is a timing belt 92. It is apparent, therefore, that each of the motors 82 and 84 is effective to drive the sprocket shaft 62 and, thereby, the sprocket 54. As will appear presently, motor 82 is utilized to rapidly return or reset the read-out head 40 to its initial read-out position at the conclusion of each film printing cycle. For this reason, the motor is referred to in the ensuing description as a reset motor. Motor 84 is a synchro motor which forms part of the synchronous drive coupling 46 and is hereinafter referred to as a synchro motor.

Figure 6:
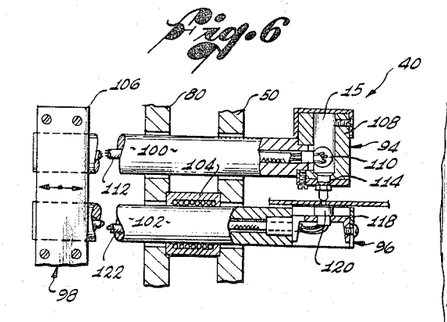
FIG. 6 is a section taken on line 6—6 in FIG. 7.

The read-out head 40 of the reader 36 comprises an upper light source 94, a lower photosensitive pick-up or detector 96, and a movable carriage 98 which supports the light source and detector for movement crosswise of the information storage tape 38. Carriage 98 comprises upper and lower slide rods 100 and 102, respectively, which extend through the frame plate 50 and the rear support plate 80, parallel to the axes of the upper tape roller 52 and sprocket 54. The lower slide rod 102 is slidably supported in a ball bushing 104 mounted between the plates in the manner best shown in FIG. 6. The upper slide rod extends through clearance holes in the plates. These carriage slide rods are located in a common plane normal to the base 49 and passing approximately midway between the upper tape roller 52 and sprocket 54. Firmly secured to the rear ends of the slide rods is a crossbar 106 which rigidly joins the slide rods to form the carriage 98. This carriage is movable along a direction line extending parallel to the axes of the upper tape roller and sprocket and transverse to the information storage tape 38. The upper slide rod 100 is located above the upper run of the tape, that is, the section of the tape which extends between the upper tape roller and sprocket. The lower slide rod 102 is located below this upper run of the tape and between the latter roller and sprocket.

Light source 94 comprises a lamp housing 108 which is secured to the forward or outboard end of the upper slide rod 100 of the read-out carriage 98. Within this lamp housing is a lamp 110 having its base mounted within the forward end of a central opening through the latter rod. The electrical leads 112 for the lamp extend through this opening. In the lower end wall of the lamp housing is a small aperture 114. Aperture 114 has a vertical axis 115 extending approximately through the center of the lamp 110, whereby light from the lamp passes through the aperture to the underlying tape 38. A pair of holddowns 116 depend from the underside of the lamp housing at either side of the aperture.

The photosensitive detector 96 comprises a housing 118 secured to the forward or outboard end of the lower carriage slide rod 102. Mounted in the upper wall of this housing, on the aperture axis 115, is a photosensitive cell 120. The electrical leads 122 for this cell extend through a central opening in the lower carriage slide rod 102. The upper run of the information storage tape 38 passes between the lamp housing holddowns 116 and the photosensitive cell 120, whereby the holddowns are effective to retain the tape in close proximity to or in contact with the cell.

Extending between the outboard support plate 58 and the rear platform bracket 78, below and parallel to the direction line of movement of the read-out carriage 98, is a lead screw 124. This lead screw extends through the intervening plates 50 and 80 and is rotatably supported in the plates 50, 58 and the bracket 78. On the forward end of the lead screw, outboard of the supporting plate 58, is an indexing disc 126. The lower end of the rear crossbar 106 on the read-out carriage has a threaded opening receiving the lead screw 124. Rotation of the lead screw, therefore, drives the carriage along its direction line of movement. Lead screw 124 is driven in rotation from the sprocket shaft 62 through a speed reducing gear train 127 located between the frame plate 50 and the rear support plate 80.

It is apparent at this point, therefore, that the reset motor 82 and the synchro motor 84 are each effective, when energized, to drive the sprocket 54 in rotation, thereby to feed the information storage tape 38 endwise past the read-out head 40, and to simultaneously drive the read-out head transversely across the tape in synchronism with its endwise movement. Thus, the tape rollers and sprocket, the read-out head carriage, the sprocket shaft and lead screw, and the drive gearing between the latter shaft and screw together constitute a transport mechanism for driving the tape and read-out head in the relative movement which is referred to herein as a relative read-out movement.

Some film printers operate in the same direction during every film printing cycle; that is to say, in these printers, the negative always moves in the same direction through the printer during successive printing cycles, and the negative is rewound in the opposite direction at the conclusion of each cycle. At the start of each printing cycle with this type of printer, the read-out head 40 occupies the position shown in FIG. 2, wherein the head is located adjacent the edge of the tape proximate to the frame plate 50. In the ensuing description, this position of the read-out head is preferred to as its retracted position. During the printing cycle, the read-out head is driven by the synchro motor 84 forwardly across the tape, that is, to the right in FIG. 2, to a position adjacent the outboard edge of the tape. This latter position of the read-out head is hereinafter referred to as its extended position. At the conclusion of the printing cycle, the read-out head is returned by the reset motor 82 rearwardly to its retracted position to condition the reader 36 for the next film printing cycle. As will appear from the ensuing description, this type of film printer operation requires that the reader 36 be electrically uncoupled from the film printer at the conclusion of each printing cycle to permit independent rewind movement of the negative and return or reset movement of the read-out head.

Other printers operate alternately in opposite directions during successive printing cycles to eliminate the necessity of rewinding the negative after each cycle. In this latter type of printer, the negative moves in one direction through the printer during alternate printing cycles and in the reverse direction through the printer during the intervening printing cycles. A new positive is printed during each such cycle, of course. In this case, the reader remains locked to the printer.

Because of the fact that all automatic cuing systems for film printers exhibit a delay of a few milliseconds or so between the passage of each cuing means past the detector which senses the cuing means and the resultant printing light correction, each cuing signal must be generated slightly in advance of the passage of its respective negative frame through the printing zone Z. In the existing cuing systems, this advance is achieved by proper placement of the cuing notches or cuing foils. However, once a given advance is thus incorporated into the negative, any further regulation of the advance, to compensate for different film printer speeds, for example, is impossible except by relocation of the cuing foils, which is totally impractical (and completely impossible with cuing notches) or by adjustment of the detector for the cuing means. Moreover, those printers, discussed above, whose direction of operation is reversed during successive printing cycles require re-adjustment of the cuing detector at the conclusion of each printing cycle or the alternate use of two properly located cuing detectors.

According to the present invention, adjustment of the cuing advance for the purposes discussed above is accomplished by angular adjustment of the housing 84a of the synchro motor 84. The manner in which such motor housing adjustment is effective to adjust the advance will be explained presently. Suffice it to say at this point that to permit such adjustment, the motor housing is rotatably supported in a mounting ring 84b which is secured to the platform 76. Angular adjustment of the housing is limited by engagement of a stop pin 84c on the housing in a slot 84d in the retaining ring. A set screw 84e locks the motor housing in its adjusted angular position.

Figure 5:
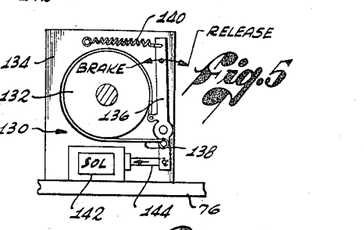
FIG. 5 is an enlarged fragmentary detail of a brake mechanism shown in FIG. 3.

FIG. 5 illustrates a solenoid actuated brake 130 for rapidly braking the rotary parts of the reader 36. This brake comprises a brake drum 132 fixed to the shaft of the reset motor 82. Rigidly mounted on the frame platform 76 between the housing of the reset motor 82 and the brake drum 132 is a plate 134 having an opening through which the motor shaft extends. A brake arm 136 is pivotally mounted intermediate its ends on this latter plate. Trained about the brake drum 132 and secured at its ends to the brake arm 136, at opposite sides of its pivot, is a brake band 138. It is apparent that pivoting of the brake arm 136 in the counterclockwise direction in FIG. 5 tensions the brake band 138 to exert a frictional braking force on the sprocket shaft 62. Clockwise pivoting of the brake arm relaxes the tension on the brake band, thereby releasing the sprocket shaft for free rotation. Connected between the plate 134 and the upper end of the brake arm 136 is a spring 140 which urges the arm in a direction to apply the brake. A solenoid 142, mounted on the platform 76, has its plunger 144 pivotally connected to the lower end of the brake arm, whereby energizing of the solenoid is effective to release the brake.

Figure 1:
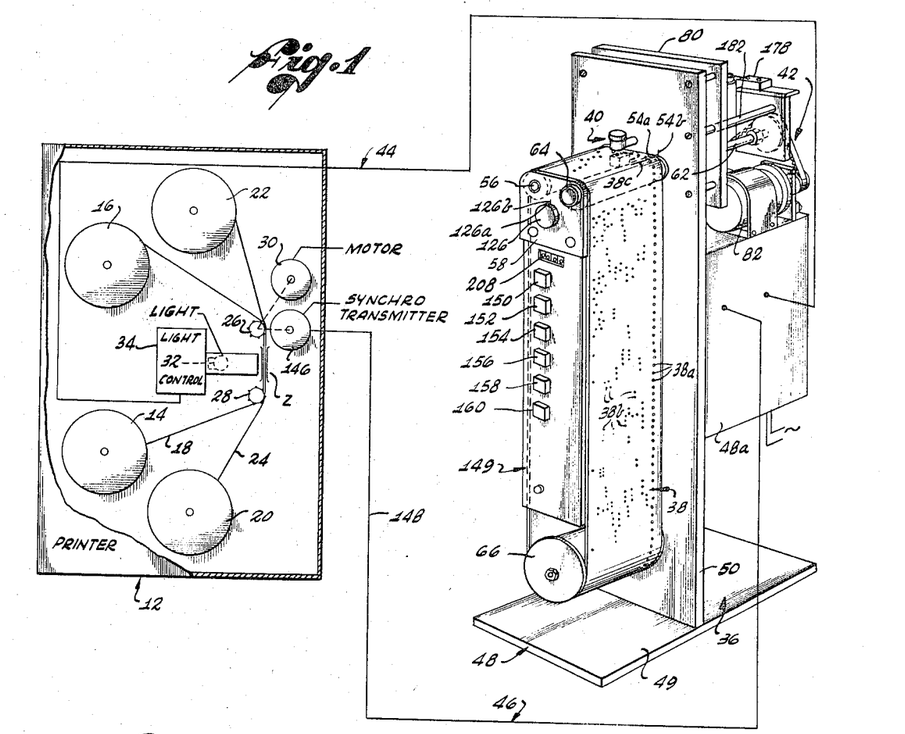
FIG. 1 diagrammatically illustrates an automatic electrical control or cuing apparatus according to the invention operatively connected to a continuous film printer for periodically actuating the light change mechanism of the printer in synchronism with movement of the negative and positive films through the printing zone of the printer, thereby to achieve proper sequence exposure of the positive film.

As noted earlier, the synchro motor 84 forms part of the synchronous drive coupling 46 between the film printer 12 and the reader 36. Also included in this synchronous drive coupling is a synchro transmitter 146. Synchro transmitted 146 is electrically coupled to the synchro motor 84 through an electrical cable 148, whereby the shaft of the synchro motor, which constitutes the driven member of the synchronous drive coupling, rotates in unison with the shaft 146a of the synchro transmitter, which constitutes the driving member of the coupling. Referring to FIG. 1, it will be observed that the synchro transmitter shaft 146a is drivably coupled to the film drive sprocket 26 of the film printer 12. Accordingly, the transmitter shaft, and thereby the motor shaft, rotates in accurately timed relation to the movement of the negative 18 and positive 24 through the printing zone Z of the printer. The synchro motor and transmitter and the electrical coupling therebetween are so arranged that rotation of the printer drive sprocket 26 in a direction to feed the negative and postive from the supply reels 14 and 20, respectively, to the take-up reels 16 and 22, respectively, is effective to rotate the synchro motor shaft in a direction to drive the read-out head 40 of the reader 36 forwardly across the information storage tape 38, that is, in a direction to move the read-out head from its retracted position toward its extended position. Assume now that the printing cycle of the film printer 12 is initiated with the read-out head 40 initially set in its retracted position of FIG. 2. It is apparent that during this printing cycle, the information storage tape 38 is driven endwise past the read-out head and the head is driven forwardly across the tape, transverse to the direction line of movement of the tape, in synchronism with the movement of the negative 18 and positive 24 through the printing zone Z of the printer. It is further apparent that owing to this simultaneous endwise movement of the tape past the read-out head and the forward movement of the head across the tape, the resultant relative read-out movement of the light source aperture 114 with respect to the tape occurs along an effective helical direction line which commences adjacent the inboard edge of the tape and progresses laterally across the tape toward its outboard edge.

Extending through the tape, along this direction line, are a multiplicity of perforations 38b which form the control information, or information bits, stored on the tape. During relative read-out movement of the tape 38 and read-out head 40, the tape perforations undergo successive relative movement between the light source aperture 114 and the photosensitive cell 120 of the head. As each perforation travels across the aperture axis 115, it momentarily exposes the cell to the light rays emanating from the lamp 110 through the aperture. The cell generates an impulse in response to each such exposure. As will be explained presently, the output of the photocell is electrically coupled to the light change mechanism 34 of the film printer 12 through the electrical cable 44 and an amplifier within a circuit housing 48a on the frame 48 in such manner that each impulse generated by the cell actuates the light change mechanism to effect a printing light correction in the film printer. The perforations 38b are initially punched in the tape in a manner to be discussed presently and in such a way that the perforations are located to periodically actuate the light change mechanism 34, and thereby effect the successive printing light corrections, at the proper scenes of the negative.

Figure 2:
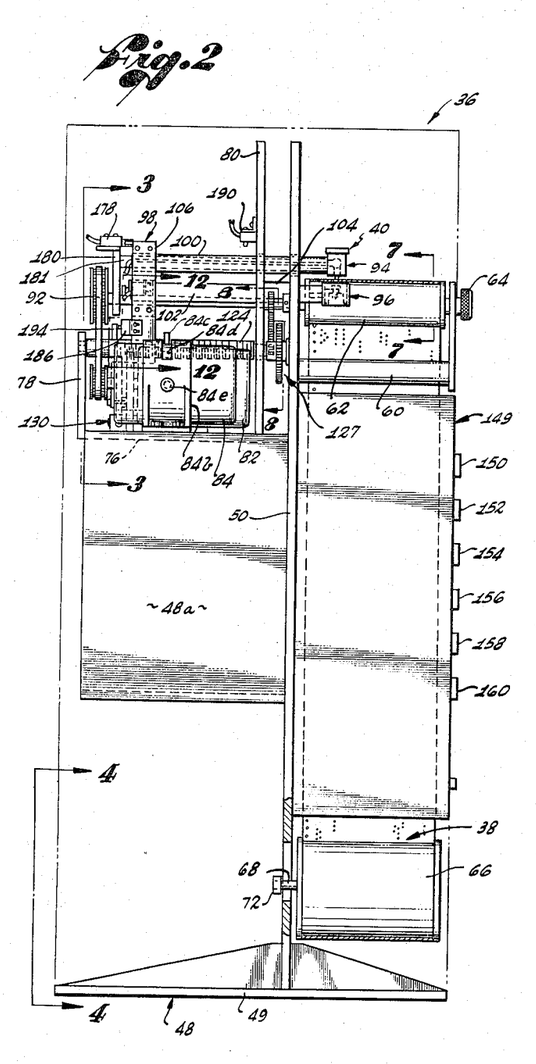
FIG. 2 is an enlarged side elevation of the reader unit embodied in the control apparatus of FIG. 1.
Figure 3:
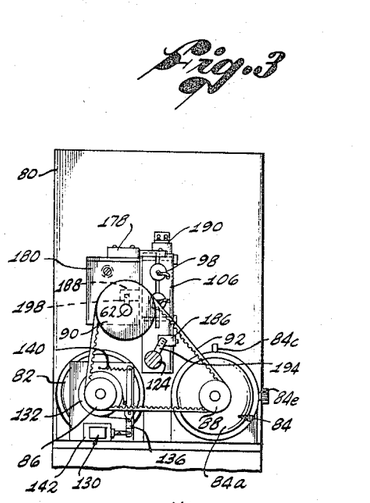
FIG. 3 is a view looking in the direction of the arrows on line 3—3 of FIG. 2.
Figure 4:
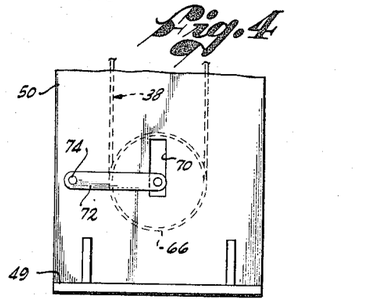
FIG. 4 is a view looking in the direction of the arrows of line 4—4 in FIG. 2.
Figure 13:
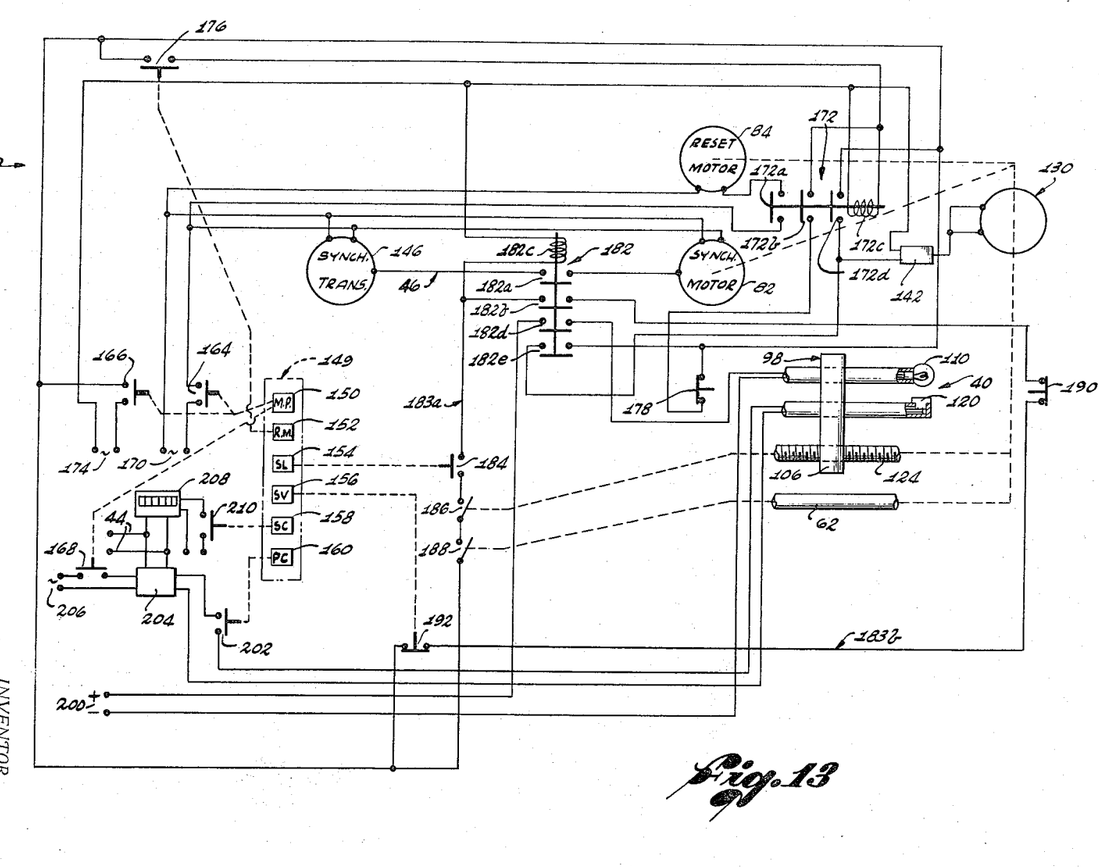
FIG. 13 schematically illustrates the electrical circuitry of the control apparatus in FIG. 1.

Reference is now made to FIG. 13 which schematically illustrates the eletcrical circuitry of the present control system. In this figure, reference numeral 149 designates a control console having a number of control buttons 150, 152, 154, 156, 158 and 160. In FIGS. 1 and 2, this control console will be observed to be mounted on the front side of the frame plate 50 in the region between the supporting posts 60 for the outboard support plate 58 and the lower tape roller 66, whereby the console is disposed within the loop formed by the information storage tape 38. Normally, the reader 36 is enclosed in a housing having a front opening through which the control console is exposed. This housing is removable to permit replacement of the information storage tape. The upper control button 150 on the control console operates a main power switch having contacts 164, 166 and 168 which are closed and remain closed in response to depression of the button 150 and are re-opened in response to subsequent depression of the button. Closure of the main power contacts 164 completes an energizing circuit from an electrical power supply 170 to the synchro motor 84 and the synchro transmitter 146. Closure of the contacts 164 also connects the power supply 170 to the reset motor 82 through the normally open contacts 172a of a relay 172. Relay 172 also includes a set of holding contacts 172b, a coil 172c, and a set of brake contacts 172d. One terminal of the coil 172c is connected to one terminal of a power supply 174. The other terminal of the relay coil is connected to the other terminal of the power supply 174 through a set of normally open contacts 176 and the main power switch contacts 166. The second control button 152 on the control console 149 is a reset motor control button, depression of which closes the switch contacts 176. These contacts re-open when the latter control button is released. Assuming that the main power switch contacts 166 are closed, it is apparent that depression of the reset motor button 152 energizes the relay 172, thereby closing its normally open contacts 172a, 172b and 172d. Closure of its contacts 172a energizes the reset motor 82. Closure of the holding contacts 172b of the relay 172 completes a holding circuit for the relay, in parallel with the reset motor button contacts 176, through a normally closed switch 178. It is apparent, therefore, that if the switch 178 is closed, depression of the reset motor button 152 results in locking of the relay 172 in its energized state and, thereby, in continuous energizing of the reset motor 82. Referring to FIG. 2, it will be observed that the switch 178 is mounted on a plate 180 which is attached, by a supporting post 181, to the rear frame plate 80. The switch supporting plate 180 also has a bore journaling the sprocket shaft 62, whereby the plate is supported both by the post 181 and the sprocket shaft. Switch 178 comprises a limit switch which is located to be engaged, and thereby opened, by the read-out carriage 98 when the latter occupies its rear retracted position of FIG. 2.

One terminal of the brake solenoid 142 is directly connected to one terminal of the power supply 174. The other terminal of the brake solenoid is connected to the other terminal of the latter power supply through the main power switch contacts 166 and the normally open contacts 172d of the relay 172. Accordingly, the brake solenoid is energized to release the brake 130 whenever the relay 172 is energized.

As will appear presently, the reset motor button 152 is depressed when the read-out carriage 98 is at the forward limit of its travel and, accordingly, when the rear limit switch 178 is closed. Recalling that the reset motor 82 is energized in a direction to drive the read-out carriage rearwardly, it is now apparent that when the reset motor button 152 is depressed with the read-out carriage at the forward limit of its travel, the carriage is driven rearwardly until it engages and thereby opens the rear limit switch 178. This breaks the holding circuit for the relay 172, thereby deenergizing the reset motor 82 and the brake solenoid 142 to terminate rearward travel of the carriage.

Indicated at 182 in FIG. 13 is a relay having normally open contacts 182a, 182b, 182d, 182e, and a relay coil 182c. One terminal of the relay coil 182c is directly connected to one terminal of the power supply 174. The other terminal of the relay coil is connected to the other terminal of the power supply 174 through two parallel circuits 183a, 183b and the main power switch contacts 166. Relay circuit 183a, which is hereinafter referred to as an energizing circuit, includes a set of normally open contacts 184 and two normally open switches 186, 188 arranged in electrical series with the main power switch contacts 166. Contacts 184 are closed by depression of the third control button 154 on the control console and re-open when the button is released. This third control button is hereinafter referred to as a synchro lock button. As will appear presently, switches 186 and 188 are operated, respectively, by the lead screw 124 and the sprocket shaft 62 in such manner that these switches are closed when the read-out carriage 98 is retracted and the lead screw and sprocket shaft are rotated to predetermined angular positions. It is apparent that if the main power switch contacts 166, the lead screw switch 186, and the sprocket shaft switch 188 are closed, depression of the synchro lock button 154 to close its contacts 184 energizes the relay 182. The normally open contacts 182a, 182b, 182d and 182e of the relay are thereby closed.

The relay circuit 183b, which is hereinafter referred to as a holding circuit, is connected in electrical parallel with the synchro lock contacts 184, the lead screw switch 186, and the sprocket shaft switch 188. Connected in electrical series in this holding circuit are the relay contacts 182b, a normally closed switch 190, and set of normally closed contacts 192. As just noted, the relay contacts 182b are closed in response to energizing of the relay 182. Switch 190, which is hereinafter referred to as a forward limit switch, is mounted on the rear side of the rear frame plate 80, as shown best in FIG. 2, so as to be engaged, and thereby opened, by the rear crossbar 106 on the read-out carriage 98, when the latter is driven to the forward limit of its travel. Contacts 192 are opened by depression of the fourth control button 156 on the control console 149. This fourth control button is hereinafter referred to as a synchro unlock button. The synchro lock contacts 184 and the synchro unlock contacts 192 are spring loaded in such a way that the synchro lock contacts return to their normal open condition upon release of the synchro lock button 154 and the synchro unlock contacts 192 return to their normal closed condition upon release of the synchro unlock button 156. It is apparent at this point that if the forward limit switch 190 and the synchro unlock contacts 192 are closed when the relay contacts 182b close in response to energizing of the relay 182 by depression of the synchro lock button 154, in the manner just explained, the relay is locked in energized condition through the holding circuit 183b. Subsequent opening of either the forward limit switch 190 or the synchro unlock contacts 192 breaks the holding circuit, thereby de-energizing the relay 182.

Figure 12:
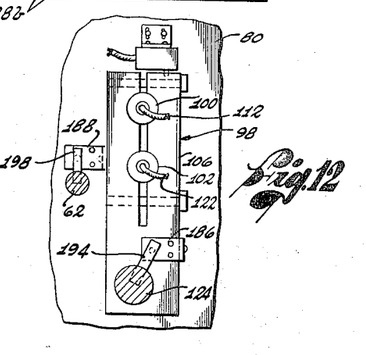
FIG. 12 is an enlarged section taken on line 12—12 in FIG. 2.

Referring to FIG. 12, it will be observed that the lead screw switch 186 is mounted on the rear crossbar 106 of the read-out carriage 98 for movement with this carriage. At the rear end of the lead screw 124 is a radially projecting switch operating pin 194 which rotates with the lead screw. The lead screw switch 186 and the lead screw pin 194 are so arranged that the pin engages the switch to close the latter when the read-out carriage 98 is in its rear retracted position and the lead screw is rotated to the position shown in FIG. 12. This position of the lead screw is hereinafter referred to as its zero position. Referring to FIG. 1, it will be observed that the index disc 126 on the forward end of the lead screw has an index mark 126a. When the lead screw 124 is in its initial angular position, this index mark is aligned with an index mark 126b on the outboard support plate 58. The sprocket shaft switch 188 is also mounted on the rear crossbar 106 of the read-out carriage 98, as shown in FIG. 12. On the rear end of the sprocket shaft 62 is a radially projecting switch actuating pin 198 which rotates with the sprocket shaft. The sprocket shaft switch 188 and the sprocket shaft pin 198 are arranged so that the pin engages the switch to close the latter, when the read-out carriage 98 is in its rear retracted position and the sprocket shaft is rotated to the angular position shown in FIG. 12. This position of the sprocket shaft is hereinafter referred to as its zero position. Referring again to FIG. 1, it will be observed that the rear flange on the tape sprocket 54 has an index mark 54a. When the sprocket shaft occupies its zero position, this index mark is aligned with an index mark 54b on the frame plate 50. It is apparent from the preceding description that the lead screw switch 186 is closed when the read-out carriage 98 is in its retracted position and the lead screw 124 is rotated to its zero position. Similarly, the sprocket shaft switch 188 is closed when the read-out carriage is in its retracted position and the sprocket shaft 62 is rotated to its zero position.

The normally open contacts 182a of the relay 182 are connected in the cable 46 which electrically couples the synchro motor 84 and the synchro transmitter 146. Opening of the relay contacts 182a in response to de-energizing of the relay 182 effectively uncouples the synchro motor from the synchro transmitter, thereby to permit independent rotation of the motor and transmitter. Closure of the relay contacts 182a in response to energizing of the relay 182 electrically couples the synchro motor and transmitter for synchronous rotation thereof.

Lamp 110 of the read-out head 40 is energized from a D.C. power supply 200. One terminal of the lamp is directly connected to one terminal of this power supply. The other terminal of the lamp is connected to the other terminal of the power supply through the normally open contacts 182d of the relay 182. It is apparent, therefore, that energizing of the relay 182 illuminates the lamp. The lamp is de-energized in response to de-energizing of the relay 182. The output of the photosensitive cell 120 of the read-out head 40 is coupled, through normally open contacts 202, to an amplifier 204 enclosed within the circuit housing of the reader 36. Contacts 202 are closed by depression of the control button 160 and are re-opened when the latter button is again depressed. Amplifier 204 is energized from an A.C. supply 206 through the master power switch contacts 168. The outut of the amplifier 204 is connected to the cable 44 leading to the light change mechanism 34 of the film priner 12. An electrical pulse counter 208 is also connected to the output of the amplifier 204. It is apparent, therefore, that each electrical impulse generated by the photosensitive cell 120 is amplified to simultaneously actuate the light change mechanism 34 of the film printer 12 and the counter 208. This counter is exposed through an opening in the control console 149 and registers the number of light corrections made during a printing cycle. Indicated at 210 in FIG. 13 is a set of normally open contacts which are closed, to reset the counter 208 to zero, by depression of the fifth control button 158 on the control console 149. This button is hereinafter referred to as a scene counter button.

The remaining normally open contacts 182e of the relay 182 are connected in electrical parallel with the normally open brake energizing contacts 172d of the relay 172. Accordingly, closure of the relay contacts 182e by energizing of the relay 182 energizes the brake solenoid 142, thereby to release the brake 130.

The operation of the illustrated automatic cuing system will now be described. As will appear from this description, the movement of the negative 18 and positive 24 through the printing zone Z of the film printer 12 and the movement of the information storage tape 38 past the read-out head 40 of the reader 36 during a normal film printing cycle occur in unison and in such manner that each tape perforation 38b causes a printing light correction in the printer at the proper frame of the negative. Such occurrence of each light correction at the exact instant that the corresponding negative frame is located in the printing zone Z requires that the synchro motor 84 and synchro transmitter 146 be locked in phase at the start of the printing cycle with the negative and the information storage tape precisely located in predetermined initial relative positions, such that the subsequent movement of each tape perforation past the read-out head leads the movement of the corresponding negative frame through the printing zone with the exact lead time necessary to compensate for the inherent time delay in the cuing system. According to the present invention, this is accomplished by locating the first negative frame in a predetermined initial position in the printer, locating the synchro transmitter rotor in a predetermined angular position, such that the transmitter output has a predetermined phase, locating the information storage tape in a predetermined initial position with respect to the read-out head, wherein the head occupies its retracted position and the sprocket shaft 62 and lead screw 124 occupy their zero positions, and adjusting the synchro motor housing or stator 84a to a predetermined angular position, which establishes the lead time or advance of the information storage tape with respect to the negative necessary to compensate for the inherent time delay in the cuing system. In connection with this latter adjustment of the synchro motor stator, it is significant to note that owing to the positive drive coupling between the synchro motor rotor, sprocket shaft and lead screw, movement of the sprocket shaft, lead screw, information storage tape, and read-out head to their initial positions stated above rotates the synchro motor rotor to a predetermined initial angular position. Recalling that the synchro transmitter rotor is also set in a predetermined initial angular position, it is apparent that the synchro motor stator has one (actually more than one) angular position wherein the synchro motor and transmitter are effectively in phase when the motor rotor occupies its latter initial position. This position of the motor stator is hereinafter referred to as its zero position. Accordingly, if the synchro motor and transmitter are interlocked while the motor stator is fixed in its zero position, the motor rotor and, hence, the sprocket shaft, lead screw, read-out head and tape remain stationary in their stated initial positions. Under these conditions, the information storage tape would be effectively aligned with the negative and the cuing system would have an effective zero cuing lead or advance. If, on the other hand, the motor stator is rotated in one direction from its zero position, when the synchro motor and transmitter are interlocked, the synchro motor rotor is rotated through a corresponding angle to a position wherein the motor and transmitter are again in phase, and the information storage tape is effectively advanced a corresponding distance relative to the negative. Rotation of the motor stator in the opposite direction from its zero position is effective to retard the tape relative to the negative. Thus, the cuing lead or advance necessary to compensate for the inherent time delay in the cuing system may be introduced into the system by proper initial setting of the synchro motor stator. Preferably, a calibrated scale (not shown) is provided to indicate the effective cuing advance corresponding to different preselected positions of the stator. As will appear presently, the cuing advance may also be reversed by angular adjustment of the synchro motor stator to accommodate the present cuing system for use with reversible film printers of the kind discussed earlier.

Returning now again to the operation of the cuing system, it is assumed that the read-out carriage 98 is in its rear retracted position and that the sprocket shaft 62 and lead screw 124 occupy their zero positions. Accordingly, the rear limit switch 178 is open and the lead screw switch 186, sprocket shaft switch 188, and the forward limit switch 190 are closed. Also, the sprocket index marks 54a, 54b and the lead screw index marks 126a, 126b are aligned. In the event that these index marks are slightly misaligned, they may be aligned by grasping the knob 64 on the forward end of the sprocket shaft 62 and rotating the knob manually until the index marks are aligned. The information storage tape 38 is then placed about the tape rollers 52, 66 and the tape sprocket 54 in such manner that an index mark 38c on the tape registers with the sprocket index mark 54a. This locates the tape in the proper initial position relative to the currently retracted read-out head 40. Finally, the synchro motor stator 84a is rotated to a position which introduces the proper cuing advance into the cuing system and is locked in this position by tightening the set screw 84e. The reader 36 of the cu-
ing system is now properly conditioned for a film printing cycle.

The film printer 12 is conditioned for the printing cycle by threading the negative 18 and positive 24 through the printer to positions wherein the first frame of the negative is properly located for the start of the cycle. This is accomplished by aligning index marks (not shown) on the negative and the film drive sprocket 26. The synchro motor rotor is located in the proper initial position for the start of the printing cycle by aligning index marks (not shown) on the drive sprocket and the printer housing. The film printer light is then energized to place the printer in readiness for the printing cycle.

The cuing system is energized by depressing the main power button 150 on the control console 149, thereby to close the main power switch contacts 164, 166 and 168. The synchro lock button 154 is then depressed to initially energize the relay 182 through the currently closed lead screw switch 186 and sprocket shaft switch 188. This initial energizing of the relay 182 closes its holding contacts 182b, thereby to lock the relay in energized condition through the currently closed forward limit switch 190 and synchro unlock contacts 192. Energizing of the relay 182 also closes its contacts 182a, 182d and 182e. Closure of the relay contacts 182a electrically interlocks the synchro motor 84 and synchro transmitter 146 for synchronous rotation thereof. Closure of the relay contacts 182d energizes the lamp 110 of the read-out head 40. Closure of the relay contacts 182e energizes the brake solenoid 142 to release the brake 130. Finally, the scene counter button 158 is depressed to reset the counter 208 to zero and the photocell button 160 is depressed to electrically couple the photosensitive cell 120 to the amplifier 204. When the synchro motor and transmitter are interlocked, as stated above, the synchro motor rotor rotates through an angle corresponding to the initial setting of the motor stator to initially advance the information storage tape 38 past the read-out head 40 a distance just sufficient to introduce the proper cuing advance into the cuing system.

The actual printing cycle is initiated by energizing the printer motor 30 to drive the film sprocket 26 and thereby move the negative and positive in unison through the printing zone Z. The rotating film sprocket 26 drives the synchro transmitter 146, and thereby the synchro motor 84, in unison with the movement of the negative and positive through the film printer. The synchro motor 84, in turn, drives the tape sprocket 54 and the lead screw 124, thereby to drive the information storage tape 38 and the read-out head 40 in their relative read-out movement. During this relative read-out movement of the tape and read-out head, the tape undergoes relative endwise movement past the head and the head advances forwardly across the tape, transverse to the direction line of movement of the tape. At this time, therefore, the information storage tape 38 and the read-out head 40 are undergoing relative read-out movement in unison with the movement of the negative 18 and positive 24 through the printing zone Z of the printer. During this relative read-out movement, the perforations 38b in the tape travel, in succession, across the axis 115 of the light source 94 and between the light source aperture 114 and the photosensitive cell 120. As each tape perforation thus travels across the light source axis 115, the photosensitive cell is momentarily exposed to light from the lamp 110 and thereby generates an electrical impulse. This electrical impluse is amplified in the amplifier 204 and simultaneously actuates the light change mechanism 34 of the film printer 12, to effect a printing light correction in the printer, and the counter 208 to register a light correction on the counter. This action is repeated in response to the movement of each tape perforation past the read-out head 40. Thus, during the course of the film printing cycle, the light change mechanism 34 of the film printer is periodically actuated to effect successive printing light corrections in timed relation to the movement of the negative 18 and positive 24 through the printing zone Z and the counter 208 is periodically actuated to register the total number of printing light corrections made.

At the conclusion of the printing cycle in a film printer which is not reversible, that is, a film printer in which the negative is rewound at the conclusion of each printing cycle, the cuing system is inactivated by depressing the synchro unlock button 156 to open the normally closed synchro unlock contacts 192. Opening of these contacts interrupts the holding circuit for the relay 182. Relay 182 then de-energizes and its contacts 182a, 182b, 182d and 182e return to their normal open condition. Opening of the relay contacts 182a effectively uncouples the synchro motor 84 from the synchro transmitter 146 to permit independent rotation of the motor and transmitter. Opening of the relay holding contacts 182b prevents the relay holding circuit 183b from being restored by closure of the forward limit switch 190 during subsequent return of the read-out carriage 98 to its retracted position, in the manner explained below. Opening of the relay contacts 182d de-energizes the read-out lamp 110. Finally, opening of the relay contacts 182e de-energizes the brake solenoid 142 to re-apply the brake 130. At this time, therefore, the read-out head 40 remains stationary at the forward limit of its travel. In the event that the operator fails to thus inactivate the system at the conclusion of the printing cycle, the advancing read-out carriage 98 will eventually open the forward limit switch 190. Opening of this switch inactivates the cuing system in precisely the same way as described above.

The read-out head is returned to its retracted position by depressing the reset button 152 on the control console 149. Depression of this button closes the contacts 176 to initially energize the holding relay 172 for the reset motor 82. Energizing of the relay 172 closes its normally open contacts 172a, 172b and 172d. Closure of the relay contacts 172b locks the relay in energized condition. Closure of the relay contacts 172d re-energizes the brake solenoid 142 to release the brake 130. Finally, closure of the relay contacts 172a energizes the reset motor 82 to drive the read-out head 40 rearwardly back to its retracted position. Upon reaching this retracted position, the read-out carriage 98 opens the rear limit switches 178 to break the holding circuit for the relay 172, thereby de-energizing the reset motor 82, to terminate rearward travel of the carriage, and the brake solenoid 142, to re-apply the brake 130. Owing to the direct coupling of the reset motor 82 to the sprocket shaft 62, this return movement of the read-out head occurs relatively rapidly.

It will be noted that the synchro motor 84, when rotating, drives the reset motor 82 and that the reset motor, when energized, drives the synchro motor. The reset motor is de-energized when driven by the synchro motor, however, and thus imposes no load on the synchro motor. Similarly, the synchro motor, when driven by the reset motor, is uncoupled from the synchro transmitter 146 and, thereby, imposes no load on the reset motor.

In the event that the cuing system is used with a reversible film printer, the printer is simply stopped at the conclusion of the printing cycle and before the trailing end of the negative unwinds completely from its film reel. The cuing system remains energized and interlocked with the printer. A new positive is then threaded through the printer and latter is operated in the reverse direction during the next printing cycle. The operation of the present cuing system during such reversed printer operation is substantially identical to the system operation discussed above with two exceptions. First, of course, the direction of the relative read-out movement of the information storage tape 38 and read-out head 40 is reversed from that stated earlier. Secondly, the synchro motor stator 84a must be rotated through its zero position to the proper setting at the opposite side of this zero position to effectively reverse the advance of the storage tape relative to the negative and thereby introduce the proper cuing advance into the cuing system. If desired, this reversal of the synchro motor stator at the conclusion of each printing cycle may be accomplished electrically by solenoids, or the like, and may occur automatically in response to reversal of the film printer motor.

Figures 10, 11:
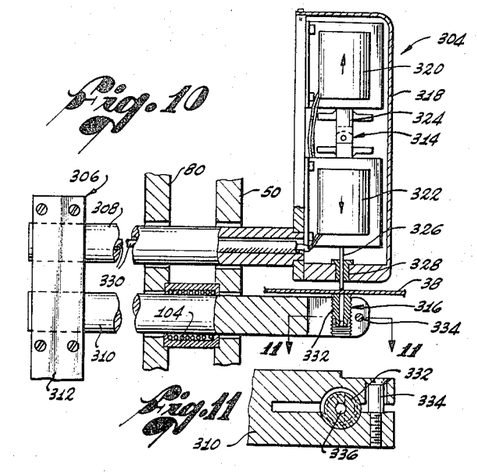

The manner in which control information is initially recorded on the information storage tape 38 will now be described by reference to FIGS. 1a, 10 and 11 which illustrate an information recording apparatus according to the invention. In these figures, reference numeral 300 designates a film editor and reference numeral 302 designates an information transcribing or recording unit having a transcribing or recording head 304. The particular recording unit illustrated comprises a tape perforating unit wherein the recording head is perforating head for punching the perforations 38b in the information storage tape 38. Perforating unit 302 is identical in every respect to the reader 36 described above except that the read-out head 40 in the reader is replaced, in the perforating unit, by the tape perforating head 304. For this reason, the tape perforating unit will be only briefly described and those parts of the perforating unit referred to which are common to the reader are designated by the same reference numerals as those applied to the corresponding parts of the reader. Perforating head 304 comprises a traveling perforator carriage 306 which is basically similar to the read-out carriage 98 in the reader. This perforator carriage includes upper and lower slide rods 308 and 310, respectively, which are slidably supported in the ball bushing 104. The rear ends of these slide rods are rigidly joined by a crossbar 312. In the lower end of the crossbar is a threaded opening (not shown) receiving the lead screw 124 of the perforating unit. Rotation of the lead screw by either the reset motor 82 or the synchro motor 84 of the perforating unit, therefore, is effective to drive the perforator carriage 306 crosswise of the information storage tape 38.

Mounted on the forward or outboard end of the upper carriage slide rod 308 is a punch assembly 314. The forward or outboard end of the lower slide rod 310 carries a die assembly 316. The upper punch assembly 314 is located above the upper run of the tape 38 and includes a punch housing 318. Mounted within this punch housing are a pair of solenoids 320 and 322 having an effective common plunger 324. Extending axially from the lower end of the plunger is a punch 326. Punch 326 is slidably fitted in a bushing 328 mounted in the lower end wall of the punch housing. The electrical leads 330 for the solenoids 320, 322 extend through a central opening in the upper slide rod 308. The die assembly 316 is located below the upper run of the information storage tape 38 and comprises a die 332 which is threaded in the forward extremity of the lower slide rod 310. This latter slide rod is axially slotted, as shown best in FIG. 11, and mounts a clamp screw 334 which may be tightened to firmly secure the die 332 against turning. Extending through the die in coaxial alignment with the punch 326 is a bore 336. This bore is dimensioned to receive the punch with a close sliding fit.

The upper punch solenoid 320, when energized, draws the punch 326 upwardly to a retracted position, wherein the lower end of the punch is retracted upwardly out of contact with the underlying tape 38. Energizing of the lower punch solenoid 322 drives the punch 326 downwardly to a lower extended position wherein its lower end extends into the die 332. It is apparent at this point, therefore, that momentary energizing of the lower punch solenoid 332 and subsequent energizing of the upper punch solenoid 320 is effective to initially drive the punch downwardly through the tape 38, thereby to form a perforation 38b in the tape, and to then retract the punch upwardly, thereby to free the tape for endwise movement past the perforating head.

The film editor 300 is basically conventional and includes a base 338 mounting a pair of spaced reel supports

340. Each reel support has a rotatable shaft 342 to receive a film reel 344 and a crank 346 for rotating the respective shaft 342. Mounted on the base 338 between the reel supports 340 is a sprocket unit 348 including a housing 349 rotatably supporting a free wheeling sprocket shaft 350. Keyed on this shaft is a film sprocket 352. A handwheel 354 is secured to the forward end of the sprocket shaft 350. Unit 348 also includes a footage indicator 356.

Coupled to the rear end of the sprocket shaft 350 is a synchro transmitter 358. A switch button 360 is mounted on the base 338 in a position which is convenient to an operator stationed at the editor. The synchro transmitter 358 is electrically coupled to the synchro motor 84 in the perforating unit 302 in the same manner as described earlier in connection with the synchro transmitter 146. The switch button 360 operates a switch device (not shown) which is electrically connected to the punch solenoids 320 and 322 in such manner that the upper punch solenoid 320 is de-energized and the lower punch solenoid 322 is energized when the button is depressed, and the upper punch solenoid is energized and the lower punch solenoid is de-energized when the button is released. Thus, each depression of the button 360 is effective to drive the punch 326 downwardly through the tape 38, to form a perforation 38b therein, and to subsequently retract the punch upwardly out of contact with the tape.

When perforating the information storage tape 38, the latter is placed on the perforating unit 302 in the same manner as described earlier in connection with the reader 36. It is apparent, therefore, that rotation of the film editor sprocket shaft 350 in one direction is effective to drive the tape 38 in the perforating unit 302 forwardly past the perforating head 304 and to simultaneously drive the head forwardly across the tape. This direction of rotation of the sprocket shaft is hereinafter referred to as its forward direction. Rotation of the sprocket shaft in the opposite, or reverse, direction is effective to drive the tape 38 in the reverse direction past the perforating head 304 and to simultaneously drive the head rearwardly across the tape.

A negative film 18 to be subsequently printed is wound on the film reels 344, in the manner illustrated in FIG. 1a, so that the film passes over and in driving contact with the sprocket 352 of the sprocket unit 348. The film may then be driven back and forth from one reel to the other by rotating the cranks 346 on the reel supports 340. During its movement from one reel to the other, the film rotates the sprocket 352 of the central sprocket unit 348 and thereby drives the tape 38 and perforating head 304 of the perforating unit 302 in relative movement, herein referred to as relative recording movement, in one direction or the other depending upon the direction of the movement of the film. In the ensuing description, it is assumed that the tape and perforating head are driven in their forward directions of relative recording movement in response to movement of the film 18 from the left-hand reel to the right-hand reel in FIG. 1a. Accordingly, the left-hand reel is hereinafter referred to as a supply reel and the right-hand reel is hereinafter referred to as a take-up reel. When perforating the tape, no cuing advance or lag is desired. Accordingly, the stator 84a of the synchro motor 84 is set in its zero position, whereby the storage tape and the film being edited are always precisely aligned; that is to say, the tape neither leads nor lags the film.

However, during editing, it is necessary to initially properly align the tape 38 and film 18 and to initially properly phase the synchro transmitter 358 on the editor with the synchro motor 84 on the recording or perforating unit 302. This is accomplished by locating the parts of the perforating unit in the same initial positions as their corresponding parts of the earlier described cuing system are located at the start of a printing cycle. The synchro transmitter in the editor is properly phased with the synchro motor in the perforating unit by aligning index marks *a* and *b* on the editor sprocket 352 and its housing 349, respectively. The film 18 is properly initially located by aligning an index mark *c* on the film with the sprocket index mark *a*. It is this film index mark *c* which is aligned, in the manner described earlier, with an index mark on the film printer drive sprocket 26 at the start of a film printing cycle.

Figure 1A:
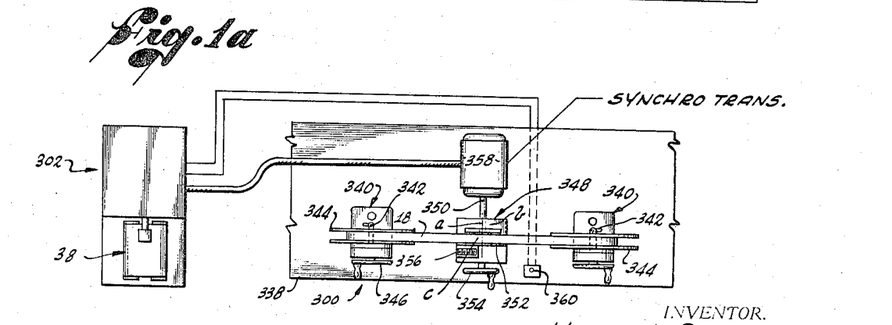
FIG. 1a illustrates a recording apparatus according to the invention for initially recording control information on the information storage unit of the control apparatus in FIG. 1.

In use of the equipment illustrated in FIG. 1a, the perforating head 304 of the perforating unit 302 is reset to its retracted position and the tape 38 is placed on the perforating unit in the same manner as described earlier in connection with the placement of the tape on the reader 36. A supply reel 344 containing the negative film 18 to be edited is then placed on the left-hand reel support 340 and the leading end of the film is trained over the central sprocket 352 and around the take-up reel 344 on the right-hand reel support in such manner that the index marks *a*, *b* and *c* are initially aligned. Contained within the housing 349 of the central sprocket unit 348 is a lamp (not shown) for illuminating the film as it pases over the unit. During the editing operation, the film editor winds the film from the supply reel to the take-up reel and observes the illuminated portion of the film over the central sprocket unit. Each time the editor notes a scene which requires a printing light correction, he momentarily terminates movement of the film and depresses the button 360 to form a perforation 38b in the tape 38. During a typical film editing operation of this type, it is generally necessary to move the film back and forth past the central sprocket unit 348 to determine the precise frame of the negative at which the light correction should be made. This accurate alignment of the individual frames of the negative is effected by rotating the handwheel 354 on the central sprocket unit. It is apparent, of course, that the tape 38 and perforating head 304 in the perforating unit 302 are driven in both forward and reverse directions of their relative recording movement with the film and, thereby, accurately follow both the forward and reverse movement of the film 18 in the film editor 300. Each time the editor makes a perforation in the tape 38, he may note the footage reading on the counter 356 as well as the number of the light corrections. When the negative 18 is subsequently printed, the reading of the counter 208 on the reader 36 is noted, at the conclusion of the film printing cycle, and compared to the number of printing light corrections recorded by the film editor, thereby to make certain that all of the required printing light corrections have occurred during the film printing cycle.

Figure 14:
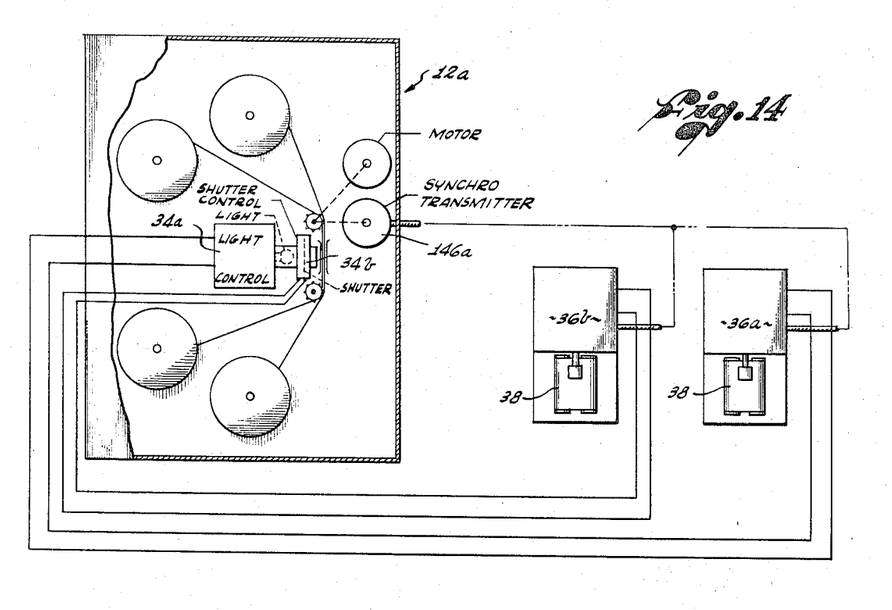
FIG. 14 illustrates a modified automatic control or cuing apparatus according to the invention for independently cuing the light correction means and dissolve shutter mechanism of a film printer.

The discussion thus far has related primarily to the use of the present cuing system for cuing the printing light correction means of a film printer. As indicated earlier, the cuing system may also cue a shutter mechanism for making fades and dissolves during the printing cycle. This may be accomplished by employing a single reader to control both the light correction means and the shutter mechanism. In certain printing systems, however, it is desirable to operate the light control mechanism and shutter mechanism concurrently but not necessarily simultaneously. According to the present invention, this may be accomplished as shown in FIG. 14. In this figure, numeral 12a denotes a film printer having a printing light correction means 34a and a shutter mechanism 34b for producing fades and dissolves. A first reader 36a and a second reader 36b are employed to control the printer. These readers are identical to the reader described earlier. The output of reader 36a is connected to the light control means 34a. The output of the second reader 36b is connected to the shutter mechanism 34b. The synchro motors of both readers are connected to a single synchro transmitter 146a in the printer.

It is apparent, therefore, that during a film printing cycle, the printing light correction means 34a and the shutter mechanism 34b are periodically cued, by the readers 36a, 36b, respectively, in synchronism with the movement of the negative through the printing zone of the printer and in accordance with the control information or perforations contained on the information storage tapes 38 of their respective readers. In this way, the light correction means and the shutter mechanism may be cued completely independently of one another at any selected frames of the negative.

Figure 15:
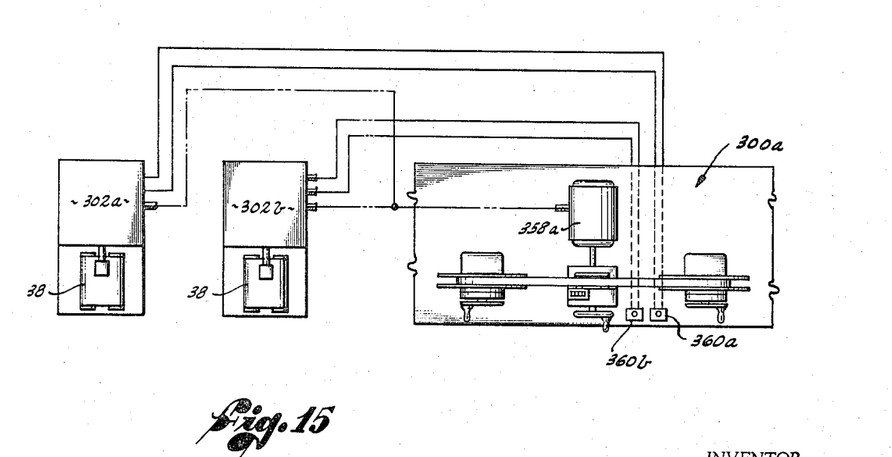
FIG. 15 illustrates a modified recording apparatus according to the invention for simultaneously preparing the two information storage members, or tapes, required in the control apparatus of FIG. 14.

FIG. 15 illustrates a recording or editing system for perforating the information storage tapes 38 of the readers 36a, 36b, respectively, in FIG. 14. In FIG. 15, numeral 300a designates a film editor which is identical to the film editor 300 described earlier except that editor 300a has two perforator control buttons 360a, 360b. Associated with the editor 300a are two perforating units 302a and 302b identical to the perforating unit 302 described earlier. Button 360a on the editor controls the solenoid-operated perforating mechanism of perforating unit 302a. Button 360b controls the perforating mechanism of perforating unit 302b. The perforated tapes 38 produced on the perforating units 302a, 302b, respectively, are subsequently used in the readers 36a, 36b, respectively. The synchro transmitter 358a of the film editor 300a is electrically connected to the synchro motors of both perforating units.

It is apparent, therefore, that movement of the film in either direction through the editor effects corresponding unified relative movement of the storage tape and punch assembly of each perforating unit. Cuing perforations for the printing light correction means 34a of the film printer 12a are produced on the tape 38 of perforating unit 302a by pushing the editor button 360a. Cuing perforations for the shutter mechanism 34b of the printer are produced on the tape 38 of the perforating unit 302b by pushing the editor button 360b.

It is now apparent, therefore, that the editing and perforating apparatus of FIG. 1a is effective to produce a perforated information storage tape which may be used in the electrical control apparatus 10 of the invention during subsequent printing of the negative 18 to initiate the required printing light corrections in the film printer 12. It will be further apparent to those skilled in the art, however, that the invention is not limited in usefulness to such film printing applications and may be employed to advantage in any control application requiring information retrieval in synchronism with movement of a driven member.

It is clear, therefore, that the invention hereinbefore described and illustrated is fully capable of attaining the several objects and advantages preliminarily set forth. While a certain preferred embodiment of the invention has been disclosed, numerous modifications in the design and arrangement of parts of the invention are possible within the spirit and scope of the following claims.

I claim:

1. In an automatic electrical control system, the combination comprising:
 a control information transcribing unit including an information storage member adapted to contain control information, a transcribing head including means for effecting the transfer of control information between said storage member and head, said head being disposed in information-transfer relation to said storage member, and a transport mechanism for driving said storage member and head in relative movement; and
 means for driving said transport mechanism, thereby to drive said storage member and transcribing head in said relative movement including a driven member drivably coupled to said transport mechanism, a driving member remote from said transcribing unit, and means operatively coupling said driving and driven members for movement of said driven member in unison with said driving member.

2. The combination according to claim 1, wherein:
 said driving means comprises a synchro motor on said transcribing unit and a synchro transmitter remote from said transcribing unit and electrically coupled to said motor, and
 said driven member comprises the shaft of said motor and said driving member comprises the shaft of said transmitter.

3. The combination according to claim 1, wherein:
 said information storage member is movable relative to said transcribing head along a first direction line and said transcribing head is movable relative to said storage member along a second direction line transverse to said first direction line, and
 said transport mechanism is drivably coupled to said information storage member for driving the latter member along said first direction line and is drivably coupled to said transcribing head for driving the latter along said second direction line.

4. The combination according to claim 1, wherein:
 said information storage member comprises an information storage tape,
 said tape being movable endwise relative to said transcribing head and said transcribing head being movable crosswise of said tape, and
 said transport mechanism being drivably connected to said tape for driving the latter in its endwise direction and being drivably connected to said transcribing head for driving the latter crosswise of said tape.

5. The combination according to claim 1, wherein:
 said information storage member is movable relative to said transcribing head along a first direction line and said transcribing head is movable relative to said storage member along a second direction line transverse to said first direction line,
 said drive means is normally operative to drive said storage member in one direction along said first direction line and is normally operative to drive said transcribing head in one direction along said second direction line,
 a rapid reset motor drivably coupled to said transport mechanism for driving said information storage member and transcribing head in the opposite directions along their respective direction lines, and
 means for selectively activating said drive means and reset motor.

6. The combination according to claim 1, wherein:
 said information storage member comprises an information storage tape having its ends joined to form a loop,
 said tape being movable endwise relative to said transcribing head and said transcribing head being movable crosswise of said tape, and
 said transport mechanism being drivably connected to said tape for driving the latter in its endwise direction and being drivably connected to said transcribing head for driving the latter crosswise of said tape, whereby the relative movement of said head relative to said tape occurs along a generally helical direction line.

7. In an automatic electrical control system, the combination comprising:
 a control information transcribing unit including a frame, rollers rotatably supported on said frame for turning about parallel axes, an information storage tape having its ends joined to form a loop, said tape being trained about and supported by said rollers for movement of said tape in its endwise direction, a carriage mounted on said frame for movement crosswise of said tape, and a transcribing head mounted on said carriage including means for effecting the transfer of control information between said tape and head, said head being disposed in information-transfer relation to said tape; and means for simultaneously driving said tape in its endwise direction and driving said transcribing head crosswise of said tape including a driven member drivably coupled to one of said rollers and to said carriage, a driving member remote from said transcribing unit, and means operatively coupling said driving and driven members for movement of said driven member in unison with said driving member.

8. The combination according to claim 7, wherein:
said driving means comprises a synchro motor on said transcribing unit and having its shaft drivably connected to said one roller and said carriage and a synchro transmitter remote from said transcribing unit and electrically coupled to said motor for rotation of said motor shaft in unison with the transmitter shaft.

9. The combination according to claim 7, wherein:
said driving means comprises a synchro motor on said transcribing unit and having its shaft drivably connected to said one roller and said carriage and a synchro transmitter remote from said transcribing unit and electrically coupled to said motor for rotation of said motor shaft in unison with the transmitter shaft,
said synchro transmitter and motor being normally effective to drive said tape in one endwise direction and to drive said transcribing head in one direction across said tape,
a rapid reset motor on said transcribing unit drivably coupled to said one roller and said carriage for simultaneously driving said tape in its opposite endwise direction and said transcribing head in the opposite direction across said tape, and
means for selectively energizing said synchro transmitter and motor and said reset motor.

10. The combination according to claim 9, including:
means for selectively electrically uncoupling said synchro transmitter and motor.

11. In an automatic electrical control system, the combination comprising:
a reader including an information storage member adapted to contain control information, a read-out head for sensing said control information, and a transport mechanism for driving said storage member and read-out head in relative read-out movement to effect retrieval of said control information by said read-out head, and
means for driving said information storage member and read-out head in said relative read-out movement including a driven member drivably connected to said transport mechanism, a driving member remote from said control unit, and means operatively coupling said driving and driven members for movement of said driven member in unison with said driving member.

12. The combination according to claim 11, wherein:
said driving means comprises a synchro motor on said control unit and a synchro transmitter remote from said control unit and electrically coupled to said motor for rotation of the motor shaft in unison with the transmitter shaft, and
said driven member comprises said motor shaft and said driving member comprises said transmitter shaft.

13. The combination according to claim 11, wherein:
said information storage member is movable relative to said read-out head along a first direction line and said read-out head is movable relative to said information storage member along a second direction line transverse to said first direction line,
said driving means being normally operative to drive said information storage member in one direction along said first direction line and to drive said read-out head in one direction along said second direction line,
a rapid reset motor on said control unit drivably connected to said transport mechanism for simultaneously driving said information storage member in the opposite direction along said first direction line and said read-out head in the opposite direction along said second direction line, and
means for selectively activating said driving means and said reset motor.

14. In an automatic electrical control system, the combination comprising:
a recording unit including an information storage member adapted to contain control information, a recording head for recording said control information on said storage member, and a transport mechanism for driving said storage member and recording head in relative recording movement, and
means for driving said transport mechanism, thereby to drive said information storage member and recording head in said relative recording movement, including a driven member drivably connected to said transport mechanism, a driving member remote from said recording unit, and means operatively coupling said driving and driven members for movement of said driven member in unison with said driving member.

15. The combination according to claim 14, wherein:
said driving means comprises a synchro motor on said recording unit and a synchro transmitter remote from said recording unit and electrically coupled to said motor for rotation of the motor shaft in unison with the transmitter shaft, and
said driven member comprises said motor shaft and said driving member comprises said transmitter shaft.

16. The combination according to claim 14, wherein:
said information storage member is movable relative to said recording head along a first direction line and said recording head is movable relative to said information storage member along a second direction line transverse to said first direction line,
said driving means being normally operative to drive said information storage member in one direction along said first direction line and to drive said recording head in one direction along said second direction line,
a rapid reset motor on said recording unit drivably connected to said transport mechanism for simultaneously driving said information storage member in the opposite direction along said first direction line and said recording head in the opposite direction along said second direction line, and
means for selectively activating said driving means and said reset motor.

17. The combination according to claim 11, wherein:
said information storage member comprises a punched tape which is movable endwise past said read-out head and said read-out head comprises a photo-sensitive detector for sensing the perforations in said tape and which is movable crosswise of the tape, and
said transport mechanism is operatively connected to said tape and detector for simultaneously driving said tape endwise past said detector and said detector crosswise across said tape.

18. The combination according to claim 14, wherein:
said information storage member comprises a tape which is movable endwise past said recording head and said recording head comprises a tape perforator which is movable crosswise of said tape, and
said transport mechanism being drivably connected to said tape and perforator for simultaneously driving said tape endwise past said perforator and said perforator crosswise across said tape.

19. In combination:
a driven member,
an electrically actuated slave unit,
an electrical control apparatus for controlling said slave unit in synchronism with the movement of said driven member comprising a reader including an information storage member containing control information, a read-out head, means supporting said storage member and read-out head for relative read-out movement thereof, said read-out head including means for sensing said control information and generating an electrical output signal responsive to said control information during said relative read-out movement of said storage member and read-out head, and means drivably coupling said storage member and read-out head to said driven member in such manner that said storage member and read-out head are driven in said relative read-out movement by and in synchronism with said driven member, and means operatively connecting said read-out head to said slave unit for operation of said slave unit in response to said electrical output signal.

20. The combination according to claim 19, wherein: said drive coupling means comprises a synchro motor on said reader including a shaft drivably connected to said storage member and read-out head, a synchro transmitter including a shaft drivably coupled to said driven member, and a synchronizing circuit electrically coupling said motor and transmitter for rotation of said motor shaft and transmitter shaft in unison.

21. In combination:

a film printer for printing a negative film on a positive film including means for producing a printing light beam, means for feeding said films through said beam, and electrically operable light control means adapted to be successively electrically actuated to control the printing light intensity, an automatic electrical cuing apparatus for said light control means comprising a reader including an information storage member containing successive bits of control information, a read-out head, means supporting said storage member and read-out head for relative read-out movement, said read-out head including means for sensing said bits during said relative read-out movement and generating an electrical impulse in response to each said bit, and means drivably coupling said storage member and read-out head to said film driving means in such manner that said storage member and read-out head are driven in said relative read-out movement by said film driving means, whereby said relative read-out movement is synchronized with the movement of said films through said printing light beam, and means electrically coupling the output of said read-out head to said light control means for successive actuation of said light control means by the electrical impulses generated by said read-out head.

22. The combination according to claim 21, wherein: said drive coupling means comprises a synchro motor on said reader including a shaft drivably connected to said storage member and read-out head, a synchro transmiter including a shaft drivably connected to said film driving means, and a synchronizing circuit electrically coupling said motor and transmitter for rotation of said motor shaft in unison with said transmitter shaft.

23. In combination:

a film editor comprising a sprocket unit including a film sprocket over which a film to be edited is adapted to be trained, and means for feeding said film endwise past said sprocket, thereby to rotate said sprocket, and a control information recording unit comprising an information storage member adapted to contain control information, an electrically actuated recording head for recording a bit of control information on said storage member in response to each electrical actuation of said head, means supporting said storage member and recording head for relative recording movement thereof, means drivably coupling said storage member and recording head to said sprocket in such manner that said storage member and recording head are driven in said relative recording movement by and in synchronism with the rotation of said sprocket, and means including a control button on said editor for electrically actuating said recording head.

24. The combination according to claim 23, wherein: said coupling means comprises a synchro motor on said recording unit including a shaft drivably connected to said storage member and recording head, a synchro transmiter on said film editor including a shaft drivably connected to said sprocket, and a synchronizing circuit electrically coupling said motor and transmitter for rotation of said motor shaft and transmiter shaft in unison.

25. The combination according to claim 1, wherein: said driving means comprises a synchro motor on said transcribing unit and a synchro transmitter remote from said transcribing unit and electrically coupled to said motor, said driven member comprises the shaft of said motor and said driving member comprises the shaft of said transmitter; and means for relatively angularly adjusting the stator and rotor of said synchro motor without relatively moving said storage member and read-out head.

26. The combination according to claim 21, wherein: said drive coupling means comprises a synchro motor on said reader including a shaft drivably connected to said storage member and read-out head, a synchro transmitter including a shaft drivably connected to said film driving means, and a synchronizing circuit electrically coupling said motor and transmitter for rotation of said motor shaft in unison with said transmitter shaft; and means for relatively angularly adjusting the stator and rotor of said synchro motor without relatively moving said storage member and read-out head.

27. The combination according to claim 21, wherein: said drive coupling means comprises a synchro motor on said reader including a shaft drivably connected to said storage member and read-out head, a synchro transmitter including a shaft drivably connected to said film driving means, and a synchronizing circuit electrically coupling said motor and transmitter for rotation of said motor shaft in unison with said transmitter shaft; and means for angularly adjusting the stator of said synchro motor relative to the rotor of the latter motor without relatively moving said storage member and read-out head.

28. In combination:

a driven member, a pair of electrically actuated slave units, an electrical control apparatus for controlling said slave units in synchronism with the movement of said driven member comprising a pair of readers each including an information storage member containing control information, a read-out head, means supporting said storage member and read-out head for relative read-out movement thereof, said read-out head including means for sensing said control information and generating an electrical output signal responsive to said control information during said relative read-out movement of said storage member and read-out head, means drivably coupling said storage member and read-out head of each reader to said driven member in such manner that said storage member and read-out head of each reader are driven in said relative read-out movement by and in synchronism with said driven member, and means operatively connecting said read-out heads to said slave units, respectively, for operation of said slave units in response to said electrical output signals.

29. In combination:

a film printer for printing a first film on a second film including means for producing a printing light beam, means for feeding said films through said beam, an electrically actuated light correction means for controlling the printing light intensity at said films, and an electrically actuated shutter mechanism in the path of said beam, an automatic electrical cuing apparatus for said light control means comprising a pair of readers each including an information storage member containing successive bits of control information, a read-out head, and means supporting said storage member and read-out head for relative read-out movement, said read-out head including means for sensing said bits during said relative read-out movement and generating an electrical impulse in response to each said bit, means drivably coupling said storage member and read-out head of each reader to said film driving means in such manner that said storage member and read-out head of each reader are driven in said relative read-out movement by said film driving means, whereby said relative read-out movement of each reader is synchronized with the movement of said films through said printing light beam, and means electrically coupling the output of said read-out heads to said light correction means and shutter mechanism, respectively, for successive actuation of said correction means and shutter mechanism by the electrical impulses generated by said read-out heads, respectively.

30. In combination:

a film editor comprising a sprocket unit including a film sprocket over which a film to be edited is adapted to be trained, and means for feeding said film endwise past said sprocket, thereby to rotate said sprocket, a pair of control information recording units each comprising an information storage member adapted to contain control information, an electrically actuated recording head for recording a bit of control information on said storage member in response to each electrical actuation of said head, and means supporting said storage member and recording head for relative recording movement thereof, and means drivably coupling said storage member and recording head of each recording unit to said sprocket in such manner that said storage member and recording head of each unit are driven in said relative recording movement by and in synchronism with the rotation of said sprocket, and means on said editor for selectively electrically actuating said recording heads.

References Cited

UNITED STATES PATENTS

| | | | |
|---|---|---|---|
| 2,939,372 | 6/1960 | Baumbach et al. | 95—75 |
| 2,990,762 | 7/1961 | Baumbach et al. | 88—24 X |

NORTON ANSHER, *Primary Examiner.*

R. A. WINTERCORN, *Assistant Examiner.*